United States Patent
Nie

(10) Patent No.: US 7,303,195 B2
(45) Date of Patent: Dec. 4, 2007

(54) CLAMPING APPARATUS WITH A CHUCK AND A PALLET RELEASABLY ATTACHABLE THERETO

(75) Inventor: Peter Nie, Menziken (CH)

(73) Assignee: Erowa AG, Reinach (CH)

( * ) Notice: Subject to any disclaimer, the term of this patent is extended or adjusted under 35 U.S.C. 154(b) by 471 days.

(21) Appl. No.: 11/106,276

(22) Filed: Apr. 14, 2005

(65) Prior Publication Data
US 2005/0238450 A1 Oct. 27, 2005

(30) Foreign Application Priority Data
Apr. 22, 2004 (CH) .................................. 0701/04

(51) Int. Cl.
*B23B 31/02* (2006.01)
*B23Q 3/00* (2006.01)

(52) U.S. Cl. ...................... 279/133; 279/118; 269/309

(58) Field of Classification Search ........ 279/118–120, 279/133, 143, 145, 156; 269/69, 70, 74, 269/309
See application file for complete search history.

(56) References Cited

U.S. PATENT DOCUMENTS

| | | | | |
|---|---|---|---|---|
| 4,647,051 A | * | 3/1987 | Stone et al. ................ | 279/2.04 |
| 5,065,991 A | * | 11/1991 | Schneider ................... | 269/309 |
| 5,415,384 A | * | 5/1995 | Obrist et al. ................ | 269/309 |
| 6,641,128 B2 | * | 11/2003 | Fries .......................... | 269/309 |
| 2002/0185802 A1 | * | 12/2002 | Haruna ....................... | 269/309 |
| 2003/0227120 A1 | | 12/2003 | Stave et al. | |
| 2004/0256780 A1 | * | 12/2004 | Lang .......................... | 269/309 |
| 2005/0248103 A1 | * | 11/2005 | Kramer ...................... | 279/43 |
| 2006/0113732 A1 | * | 6/2006 | Hediger ..................... | 279/19.3 |

FOREIGN PATENT DOCUMENTS

| | | |
|---|---|---|
| EP | 0 255 042 | 2/1988 |
| GB | 2 113 578 | 8/1983 |

\* cited by examiner

*Primary Examiner*—Monica Carter
*Assistant Examiner*—Eric A. Gates
(74) *Attorney, Agent, or Firm*—Maginot, Moore & Beck

(57) ABSTRACT

The clamping apparatus comprises a chuck member and a pallet releasably attachable thereto. The chuck member has four centering grooves, arranged offset to each other by 90° around the central Z-axis, while the pallet has four correspondingly located centering pins. In each of the four centering grooves, one of the groove flanks serves for centering the associated centering pin of the pallet, while the other groove flank is constituted by a clamping member. Upon clamping the pallet to the chuck member, the associated clamping member engages a recess provided on the centering pin and pulls the latter one in Z-direction into the centering groove of the chuck member. Simultaneously, the clamping member also presses the centering pin against the other groove flank. Thereby, the pallet is positioned relative to the chuck member in X-, Y- and Z-directions and clamped to the chuck member.

13 Claims, 3 Drawing Sheets

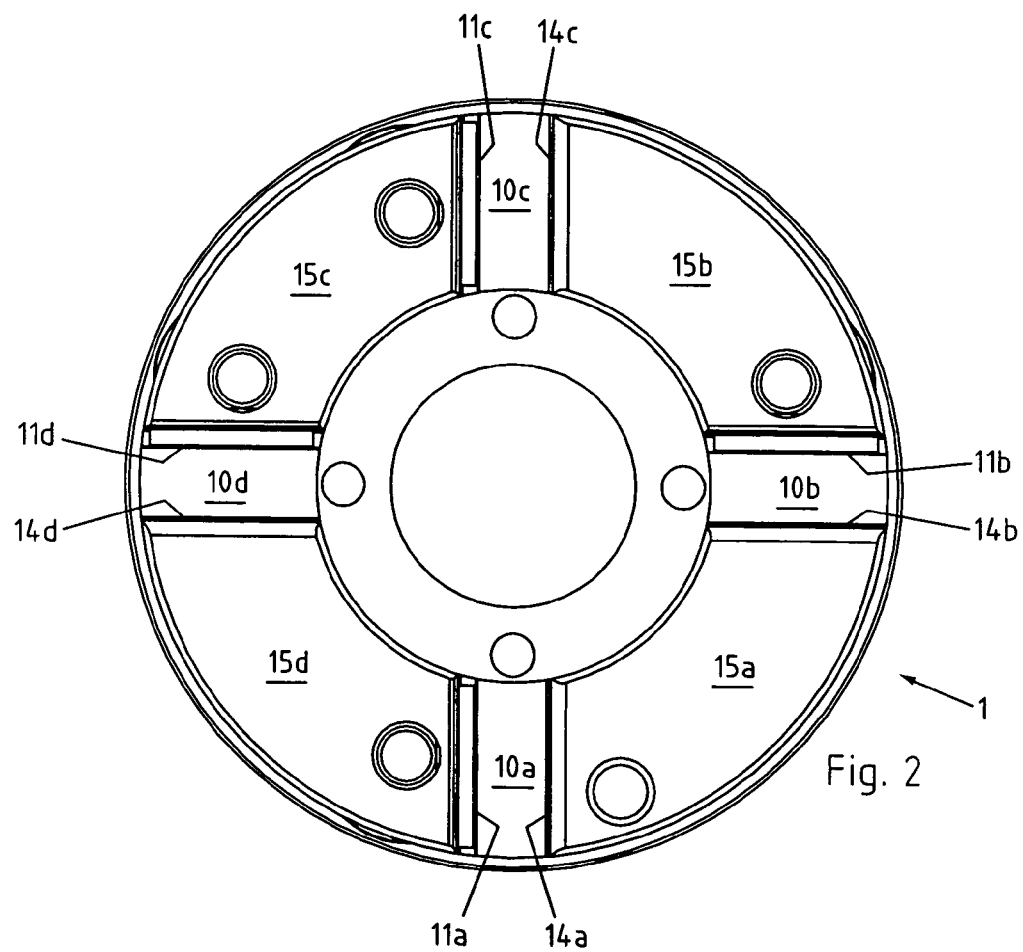
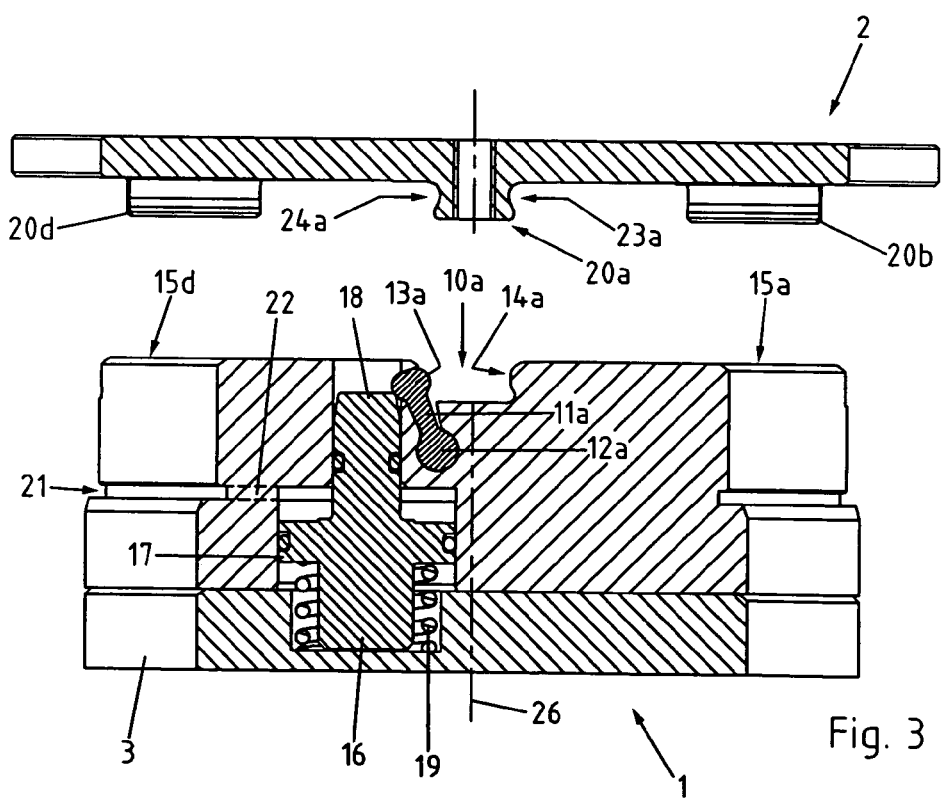

CLAMPING APPARATUS WITH A CHUCK AND A PALLET RELEASABLY ATTACHABLE THERETO

BACKGROUND OF THE INVENTION

The present invention relates to a clamping apparatus comprising a chuck member and a pallet member adapted to be releasably fixed to the chuck member. The chuck member has at least three centering grooves, and the pallet member has a corresponding number of centering pins arranged and shaped to correspond to the centering grooves. The chuck member further comprises clamping means for clamping the pallet to the chuck member.

Clamping apparatuses of the kind mentioned above are mainly used to fix work pieces in a positionally well defined manner in the machining area of a machine tool. Thereby, the work piece first is fixed to a pallet and the pallet is to be releasably attached to the chuck member. In most cases, the chuck member itself is fixedly attached to the machine tool.

In known clamping apparatuses of this kind, usually the chuck member is provided with four centering pins, each having two opposed, conically shaped side surfaces. The pallet is provided with four grooves, corresponding in location and shape to the afore mentioned centering pins. The pallet comprises a centrally located clamping bar by means of which it can be clampingly fixed to the chuck member. Upon clampingly fixing the pallet to the chuck member, the centering pins enter the centering grooves and align the pallet with regard to the chuck member in X- and Y-directions as well as with regard to its angular position.

PRIOR ART

The document EP 0 255 042 discloses a clamping apparatus of the kind generally referred to herein, adapted to fix a work piece on a machine tool. The clamping apparatus essentially comprises a chuck member, an electrode holder and a clamping bar fixed to the latter one. The top surface of the electrode holder is provided with four grooves, offset to each other by 90° around the central Z-axis. Each flank of each groove has an incision for the formation of a lip that is elastically resilient in Z-direction.

Four ridges' protrude from the surface of the chuck member that faces the electrode holder. The shape and location of these ridges essentially correspond to the shape and location of the above mentioned four grooves provided in the electrode holder. The corners of the chuck member are provided with four posts serving as a Z-direction reference. Upon clamping the electrode holder to the chuck member, the ridges of the chuck member engage the elastic lips of the electrode holder and axially deform the latter ones in Z-direction until the afore mentioned Z-reference posts rest on support surfaces provided on the electrode holder; thus, the Z-position of the electrode holder relative to the chuck member is determined. By means of the ridges engaging the resilient lips, the electrode holder is positioned in X- and Y-directions as well as regarding its angular position around the Z-axis with regard to the chuck member.

In order to remove the electrode holder from the chuck member, the electrode holder has to be moved axially, i.e. in Z-axis direction, along a path corresponding at least to the length of the central clamping bar towering above the electrode holder. In other words, this means that a free space has to be provided, extending in Z-direction and located above the electrode holder clamped to the chuck member, which corresponds at least to the length of the clamping bar in order to enable the electrode holder to be lifted off the chuck member and removed.

OBJECTS OF THE INVENTION

It is an object of the invention to provide a clamping apparatus of the kind referred to herein above which has a low total height in assembled state and which needs only a comparatively small free space in Z-direction for enabling the pallet to be removed from the chuck member.

SUMMARY OF THE INVENTION

The meet these and other objects, the present invention provides a clamping apparatus, comprising a chuck member and a pallet member adapted to be releasably fixed to the chuck member. The chuck member has at least three centering grooves and each of the centering grooves has a first lateral groove flank and a second lateral groove flank.

The pallet member has at least three centering pins arranged and shaped to correspond to the three centering grooves. Each of the centering pins has a lateral recess, and the chuck member comprises clamping means for clamping the pallet to the chuck member.

Each of the above mentioned first centering groove flanks of the chuck member is adapted to determine the position of the associated centering pin of the pallet, and each of the above mentioned second centering groove flanks is provided with a clamping member adapted to engage the recess of the associated centering pin upon clamping the pallet to the chuck member, such that each of the centering pins is pulled in Z-direction into the associated centering groove and simultaneously pressed against the above mentioned first centering groove flank of the associated centering groove.

Thus, the basic idea behind the present invention may be seen in the fact that no separate clamping bolt or bar has to be provided to fix the pallet to the chuck member. Rather, the centering pins provided on the pallet both serve for centering the pallet with regard to the chuck member and simultaneously for fixing the pallet to the chuck member. To this end, in each centering groove of the chuck member, one of the groove flanks is adapted to center or position the centering pin engaging it, while the opposite groove flank is constituted by a clamping member that is adapted to engage a recess and/or embossment provided on the associated centering pin. Thereby, the clamping member not only pulls the centering pin in Z-direction into the centering groove, but pushes it simultaneously against the opposed groove flank serving for centering purposes.

BRIEF DESCRIPTION OF THE DRAWINGS

FIG. 2 shows a top view of the chuck;

FIG. 3 shows a cross sectional view of a pallet and a chuck, the two elements being separated from each other;

DETAILED DESCRIPTION OF A PREFERRED EMBODIMENT

Figure 1:
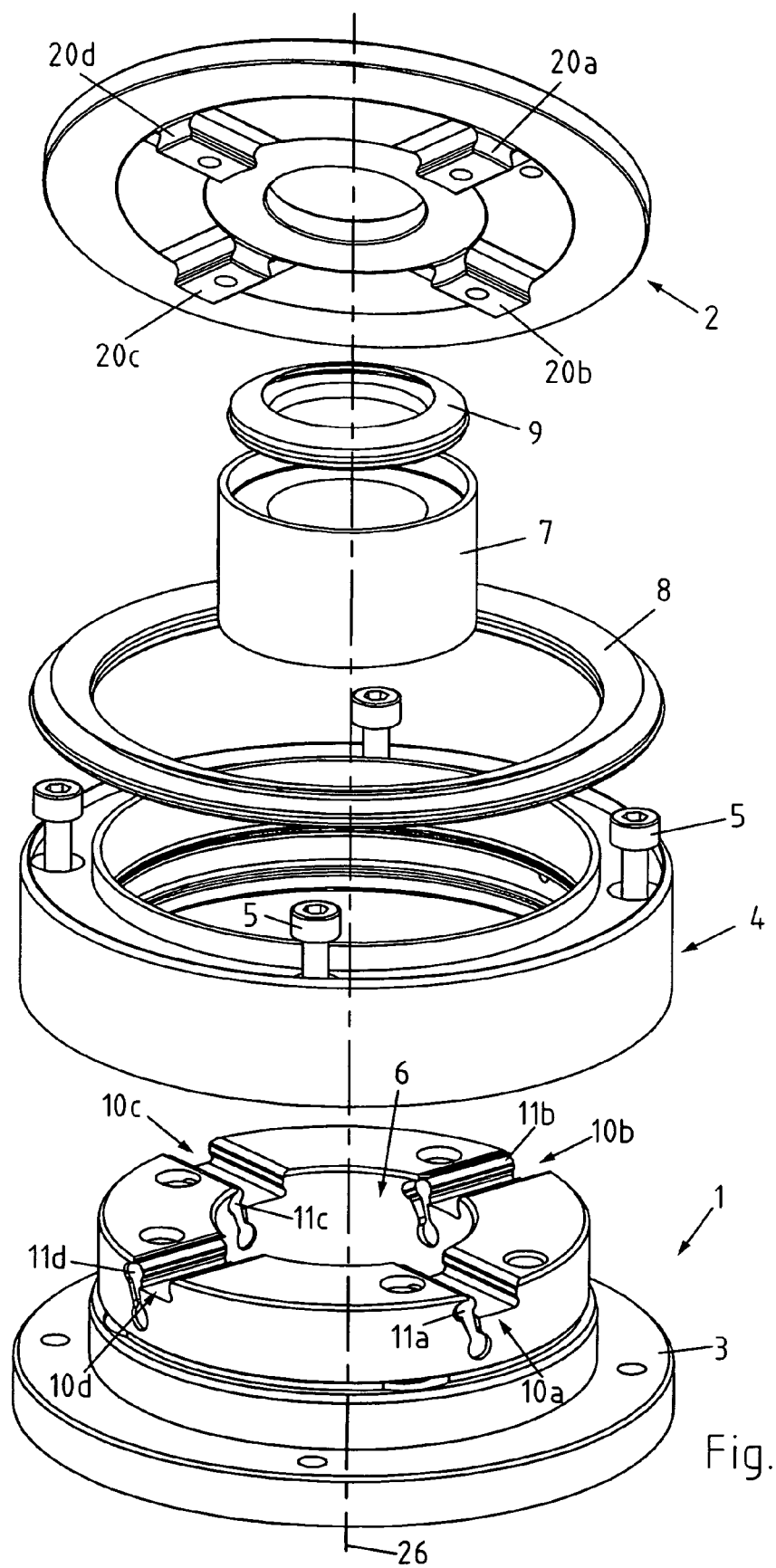
FIG. 1 shows a perspective view of a chuck and a pallet.

FIG. 1 shows a pallet 2 as well as a chuck 1, also including some details to be discussed later, in a perspective view. The chuck has essentially cylindrical shape and comprises an essentially circular base plate 3 to which is fixed an annular element 4 by means of a plurality of screws 5; thereby, that annular element 4 surrounds the real chuck member 1. The chuck member 1 is provided with a central, continuous opening 6 which is adapted to receive a sleeve member 7.

Inserted from the top into both the annular element 4 and into the sleeve 7 is in each case an annular sealing member 8 and 9, respectively. The chuck member 1 is further provided with four centering grooves 10a, 10b, 10c and 10d which are offset to each other by 90° and coaxially arranged around the central Z-axis 26. On the other hand, the pallet 2 is provided with four centering pins 20a, 20b, 20c and 20d, arranged correspondingly to the centering grooves 10a, 10b, 10c and 10d of the chuck member 1 and adapted to cooperate therewith upon assembling the two elements 1 and 2.

In the case of the centering grooves 10a, 10b, 10c and 10d provided in the chuck member 1, in each case, one of the sides or flanks of the groove is adapted to serve for centering the centering pins of the pallet 2 cooperating therewith, while the other groove side or flank is constituted by a clamping element in the kind of a pivotally supported latch 11a, 11b, 11c and 11d. The totally four latches 11a, 11b, 11c and 11d serve for clamping the pallet 2 to the chuck member 1, as will be explained in more detail herein after. The particular latch 11a, 11b, 11c and 11d is laterally moved into a groove provided in the chuck member for that purpose. In an assembled state of the clamping device, the relating latch 11a, 11b, 11c and 11d is fixed at its inner side by the sleeve 7 and at its outer side by the annular element 4 as far as the axial direction is concerned.

FIG. 2 shows a top view of the chuck member 1. Besides the four centering grooves 10a, 10b, 10c and 10d and the four latches 11a, 11b, 11c and 11d, this illustration also shows the four groove sides or flanks 14a, 14b, 14c and 14d. Considering the two centering grooves 10c and 10a, being opposed to each other as seen in vertical direction of the drawing, it is to be noted that in each case the right side groove flanks 14a, 14c constitute a reference for determining the position of the pallet 2 with regard to the chuck 1 in X-direction. Now considering the other two centering grooves 10d and 10b, being opposed to each other as seen in horizontal direction of the drawing, it is to be noted that in each case the lower groove flanks 14a, 14c constitute a reference for determining the position of the pallet 2 with regard to the chuck 1 in Y-direction. The remaining surfaces 15a, 15b, 15c and 15d, in each case located between adjacent centering grooves 10a/10b; 10b/10c; 10c/10d; 10d/10a, form a rest surface for determining the position of the palette 2 relative to the chuck 1 in Z-direction. These rest surfaces 15a, 15b, 15c and 15d have essentially the shape of a segment of an annulus.

FIG. 3 shows the pallet 2 and the chuck member 1 in a cross sectional view, taken along a plane running through the centering groove 10a of the pallet 2 and the associated centering pin 20a, whereby the round bottom plate is shown in a reduced scale. The bottom part of the associated latch 11a comprises a cylindrical portion 12a that is received in a corresponding groove of the chuck member 1. Simultaneously, that cylindrical portion 12 constitutes the bearing around which the latch 11a is pivoted. For operating the latch 11a, a clamping piston 16 is provided that is biases by means of a spring 19 resting on the base plate 3 in a direction towards the latch 11a. The clamping piston 16 comprises an annular shoulder 17 as well as a cylindrical protrusion 18, the latter one having a conically shaped front portion by means of which the latch 11a is radially movable and pivotal around its bearing, respectively. Preferably, the protrusion 18 is somewhat flattened at that side that faces the latch 11a in order to increase the contact surface between protrusion 18 and latch 11a and, thereby, to decrease the specific load pressure exerted to the top portion 13a of the latch 11a.

In order to move the clamping piston 16, against the force of the spring 19, into its initial rest position as shown in FIG. 3 discussed here, pressurized air is fed to the chamber located above the shoulder 17. Feeding that pressurized air into that chamber is accomplished through an annular groove 21 and a channel 22. The clamping device being in its assembled state as shown in FIGS. 3 and 4, the groove 21 constitutes, in cooperation with the annular circular element 4 (cf. FIG. 1), an annular channel that is sealed by means of not shown sealing elements.

The particular centering pin 20a is provided with recesses 23a, 24a on both of its opposite sides. The right side groove flank 14a, as seen in FIG. 3, provided for centering the associated centering pin 20a, is designed as an embossment adapted to rest on the one, as seen in FIG. 3, right side recess 23a of the centering pin 20a upon clamping the palette 2 to the chuck 1. As far as the latch 11a is concerned, it is also provided with an embossment 13a adapted to rest on the other, as seen in FIG. 3, left side recess 24a of the centering pin 20a upon clamping the palette 2 to the chuck 1.

Figure 4:
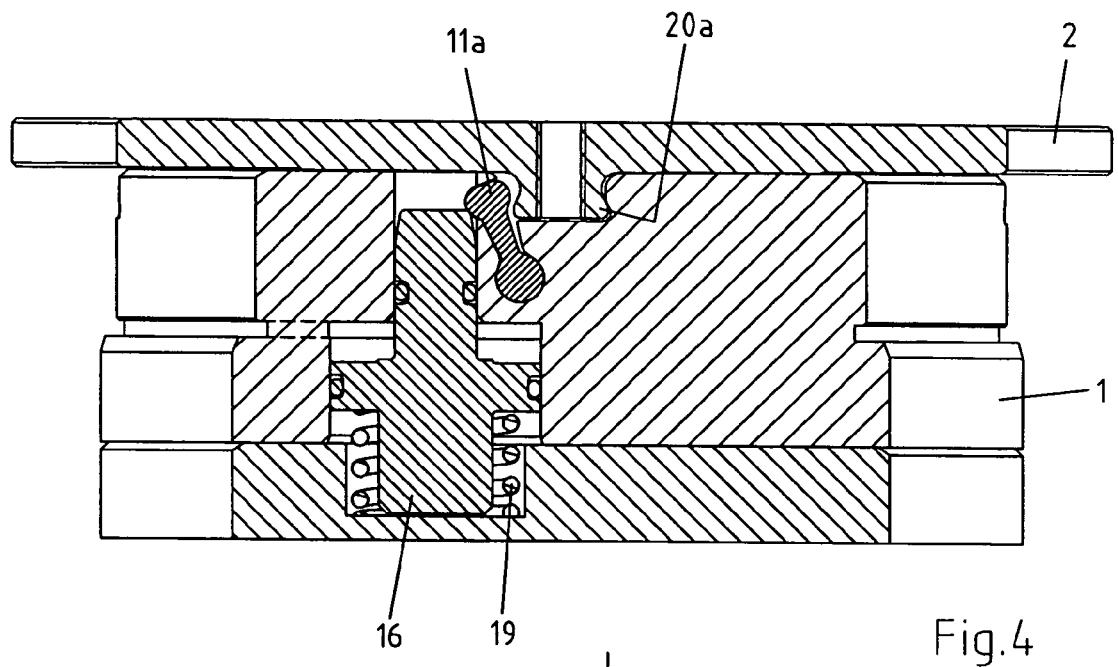
FIG. 4 shows a cross sectional view of the pallet and the chuck in an assembled state, but not yet clamped to each other.

FIG. 4 shows a cross sectional view of the pallet 2 and the chuck member 1 in an assembled, but not yet clamped state. In order to ensure that the particular centering pin 20a of the pallet 2 can penetrate the corresponding centering groove of the chuck member 1, the piston 16 has to be pneumatically moved in its rest or initial position downwards, as shown in FIG. 4. Thereby, the latch 11a is in an initial position where it is pivoted to the left side, as seen in FIG. 4. In order to further ensure that the latch 11a is in its above mentioned initial, left side position once the clamping piston 16 is in its lower rest position, if required, a (not shown) spring element can be provided. On the other hand, the latch 11a is designed such that it will be moved to its desired left side rest position by the centering pin 20a penetrating the centering groove 10a, should it be in its right side position.

Figure 5:
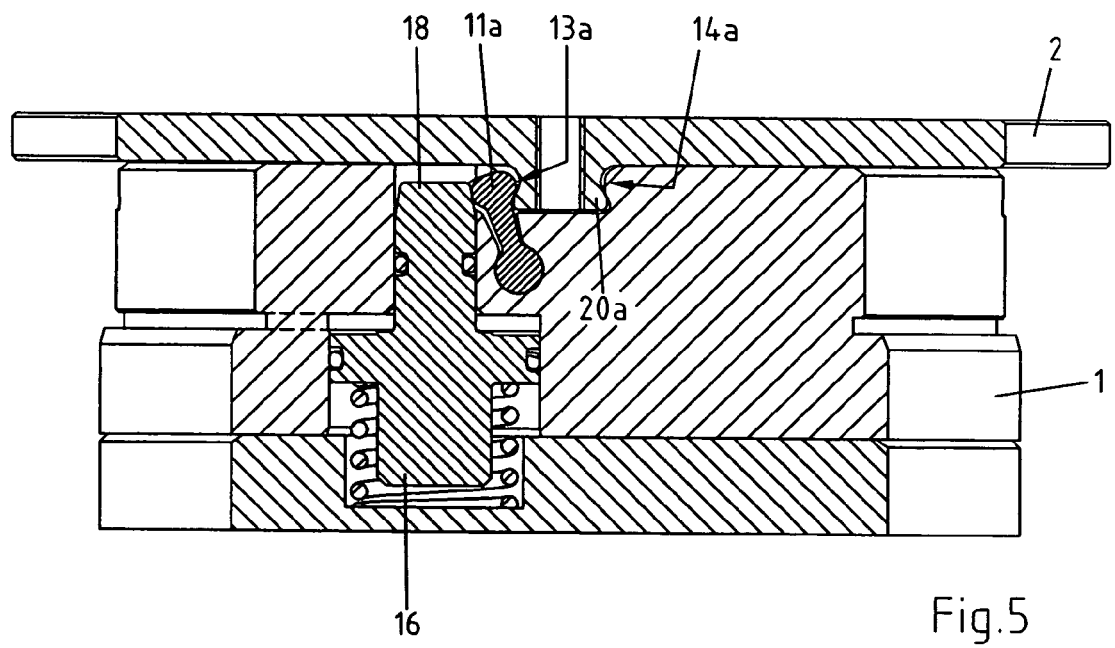
FIG. 5 shows a cross sectional view of the pallet and the chuck assembled and clamped to each other.

Once the pallet 2 rests on the Z-direction reference surfaces of the chuck member 1 and the centering pins are received in the associated centering grooves, the pneumatic force acting on the clamping piston 16 is reduced, with the result that the latter one is moved into the operating position according to FIG. 5 under the influence of the associated spring 19. During the upwards movement of the clamping piston 16, the slightly conical protrusion 18 presses and moves the latch 11a in a direction towards the groove side or flank 14a. Due to the design both of the groove side or flank 14a and the embossment 13a of the latch 11a, the centering pin 20a is drawn into the associated groove, with the result that, on the one hand, a centering in Z-direction takes place. On the other hand, and essentially simultaneously, also a centering of the palette 2 in X- and Y-directions as well as regarding to its angular position around the Z-axis is realized. By moving the clamping piston 16 upwards, the latch 11a is pivoted, depending on its practical design, towards the right side along a path amounting to between a few tenth of a millimeter up to a few millimeters, into its operating position in which the pallet 2 is clamped to the chuck member 1. Thereby, it also rests on the Z-reference surfaces 15a, 15b, 15c and 15d (cf. FIG. 2), with the result, that besides an exact positioning in Z-direction also an exact positioning not only in X- and Y-directions, but also with regard to its angular position around the Z-axis is ensured. It should be noted that the centering pin 20a is dimensioned such that it does not rest on the bottom of the centering groove once the clamping operation is completed.

It is understood that all the foregoing explanations given with regards the cooperation of the centering pin 20a with the centering groove 10a are equally true for the three other centering pins 20b, 20c and 20d and for the three other centering grooves 10b, 10c and 10d, including all the corresponding elements.

Instead of four different clamping pistons for operating the four latches, a common annular piston could be provided, having four cylindrical protrusions for operating the four latches. On the other hand, the particular centering pin could be provided, instead of or additionally to the previously mentioned recess, with an embossment cooperating with a correspondingly designed clamping means.

The advantages of a clamping apparatus according to the present invention and as previously described as a possible embodiment can be summed up as follows:

Very compact design, particularly very low height since the need for a usually quite long central clamping bar, as provided by most of the prior art devices, can be removed;

For removing the pallet, a free space above the clamping chuck in the region of 10 mm is sufficient;

Very simple design, no elastically resilient centering elements have to be provided;

Very high accuracy of centering, both absolutely and as far as repeatability is concerned;

By the lack of a central clamping member in the shape of a long pin member, the chuck member can be provided with a continuous central aperture;

Due to the provision of the previously mentioned two annular sealing members, an effective protection of the elements relevant for the centering and located between the said two sealing members is achieved;

The clamping pistons provided for operating the latches are pneumatically sealed vis-à-vis the environment;

No air has to be blown out for pneumatically cleaning the centering and/or rest surfaces; and No high clamping forces acting in Z-direction are required; thus, the pallet can be designed very shallow.

What is claimed is:

1. A clamping apparatus comprising a chuck member and a pallet member adapted to be releasably fixed to said chuck member; said chuck member having at least three centering grooves and each of said centering grooves having a first lateral groove flank and a second lateral groove flank; said pallet member having at least three centering pins arranged and shaped to correspond to said at least three centering grooves, each of said centering pins having a lateral recess and/or embossment; said chuck member further comprising clamping means for clamping said pallet to said chuck member; each of said first centering groove flanks of said chuck member being adapted to determine the position of the associated centering pin of said pallet and each of said second centering groove flanks is provided with a clamping member adapted to engage said recess and/or embossment of said associated centering pin upon clamping said pallet to said chuck member, such that each of said centering pins is pulled in Z-direction into the associated centering groove and simultaneously pressed against said first centering groove flank of the associated centering groove, and in which each of said clamping members is designed as a pivoting latch member that is adapted to be pivoted towards the opposed groove flank by means of a clamping piston movable in Z-direction.

2. A clamping apparatus according to claim 1 in which each of said centering pins is provided, on both sides, with a recess and/or an embossment, and that said first centering groove flank is adapted to determine the position of the associated centering pin has a shape corresponding to the shape of the centering pin engaging it, such as to pull said centering pin in Z-direction into the centering groove under the influence of said clamping member.

3. A clamping apparatus according to claim 2 in which said chuck member is provided with four centering grooves, arranged offset to each other by 90° around the Z-axis, and in which said pallet is provided with four correspondingly located centering pins, whereby, in each case, two diametrically opposed centering grooves are adapted to determine the position of the pallet in X-direction, while the two remaining, diametrically opposed centering grooves are adapted to determine the position of the pallet in Y-direction.

4. A clamping apparatus according to claim 1 in which said chuck member is provided with four centering grooves, arranged offset to each other by 90° around the Z-axis, and in which said pallet is provided with four correspondingly located centering pins, whereby, in each case, two diametrically opposed centering grooves are adapted to determine the position of the pallet in X-direction, while the two remaining, diametrically opposed centering grooves are adapted to determine the position of the pallet in Y-direction.

5. A clamping apparatus according to claim 1 in which the center of rotation of the clamping member is located below the associated centering groove.

6. A clamping apparatus according to claim 4 in which said clamping piston is provided with a cylindrical protrusion, adapted to pivot said clamping member from an initial or rest position into an operating or clamping position.

7. A clamping apparatus according to claim 1 in which said clamping piston is provided with a cylindrical protrusion, adapted to pivot said clamping member from an initial or rest position into an operating or clamping position.

8. A clamping apparatus according to claim 7 in which said cylindrical protrusion has a conical front portion.

9. A clamping apparatus according to claim 7 in which said clamping piston is biased in the direction towards said clamping member by means of a spring member.

10. A clamping apparatus according to claim 1 in which said clamping piston is biased in the direction towards said clamping member by means of a spring member.

11. A clamping member according to claim 1 in which said chuck member is provided with a central continuous opening.

12. A clamping apparatus according to claim 1 in which said chuck member is provided with a plurality of rest surfaces serving as Z-axis references and each located between adjacent centering grooves.

13. A clamping apparatus according to claim 12 in which said rest surfaces serving as Z-axis references are shaped essentially in the form of a segment of an annulus.

* * * * *